(12) United States Patent
Reese

(10) Patent No.: US 7,630,905 B1
(45) Date of Patent: Dec. 8, 2009

(54) CALL CAMPAIGN METHODOLOGIES

(76) Inventor: Ralph Reese, 330 Sampsonia Way, Pittsburgh, PA (US) 15212

( * ) Notice: Subject to any disclaimer, the term of this patent is extended or adjusted under 35 U.S.C. 154(b) by 698 days.

(21) Appl. No.: 10/753,025

(22) Filed: Jan. 7, 2004

(51) Int. Cl.
*G06Q 10/00* (2006.01)
*H04M 5/00* (2006.01)
*H04M 1/64* (2006.01)

(52) U.S. Cl. .......................... 705/1; 379/65; 379/265.01

(58) Field of Classification Search ....................... 705/1
See application file for complete search history.

(56) References Cited

U.S. PATENT DOCUMENTS

| | | | | |
|---|---|---|---|---|
| 5,581,602 A | * | 12/1996 | Szlam et al. | 379/88.05 |
| 5,815,566 A | * | 9/1998 | Ramot et al. | 379/210.01 |
| 5,889,799 A | * | 3/1999 | Grossman et al. | 379/266.08 |
| 6,014,439 A | | 1/2000 | Walker et al. | 379/266 |
| 6,134,530 A | | 10/2000 | Bunting et al. | 705/7 |
| 6,178,240 B1 | | 1/2001 | Walker et al. | 379/266 |
| 6,266,640 B1 | * | 7/2001 | Fromm | 704/273 |
| 6,330,327 B1 | * | 12/2001 | Lee et al. | 379/266.1 |
| 6,349,290 B1 | | 2/2002 | Horowitz et al. | 705/35 |
| 6,434,121 B1 | * | 8/2002 | Davidson et al. | 370/270 |
| 6,587,557 B1 | * | 7/2003 | Smith | 379/265.01 |
| 7,103,173 B2 | * | 9/2006 | Rodenbusch et al. | 379/266.07 |
| 7,110,525 B1 | * | 9/2006 | Heller et al. | 379/265.11 |
| 7,471,787 B2 | * | 12/2008 | Chambers et al. | 379/265.02 |
| 2002/0006193 A1 | | 1/2002 | Rodenbusch et al. | 379/266.01 |
| 2003/0068029 A1 | * | 4/2003 | McFarland | 379/202.01 |
| 2004/0133434 A1 | * | 7/2004 | Szlam et al. | 705/1 |
| 2004/0170258 A1 | * | 9/2004 | Levin et al. | 379/88.01 |
| 2004/0234065 A1 | * | 11/2004 | Anderson | 379/266.07 |

FOREIGN PATENT DOCUMENTS

EP     687095 A2 * 12/1995

* cited by examiner

*Primary Examiner*—John W Hayes
*Assistant Examiner*—Fadey S Jabr
(74) *Attorney, Agent, or Firm*—Standley Law Group LLP

(57) ABSTRACT

A method for minimizing the number of overdials attributable to a party comprising the steps of: (1) placing a telephone call using a predictive dialer and a call list; (2) monitoring call center agents to determine call center agent availability, the call center agents conducting a telemarketing campaign for at least a first calling party; (3) monitoring the telephone call to determine when the telephone call is answered thereby resulting in an answered call; (4) assigning the answered call to a calling party, and (5) transferring the answered call for processing, wherein processing is performed by a call center agent if available and wherein processing is performed by a message player if no call center agent is available to process the answered call.

20 Claims, No Drawings

CALL CAMPAIGN METHODOLOGIES

TECHNICAL FIELD OF THE INVENTION

The present invention relates to computer telephony systems and more particularly to methods for conducting telemarketing calling campaign.

BACKGROUND OF THE INVENTION

Automated telephone systems are used extensively to both place and receive telephone calls. For example, airline reservations systems and banks may utilize the inbound or call-receiving features of an automated telephone system, while marketing groups and credit collection departments would utilize the outbound calling features of the system. In a typical outbound calling scenario, a call campaign will be initiated at a call center, using a sophisticated system that combines telephone switching and computer information processing technologies. These sophisticated systems are commonly referred to as computer-telephony-integration (CTI) systems or more narrowly as call management systems or predictive dialing systems. Outbound telemarketing campaigns are conducted for a variety of purposes, including selling and lead generation, obtaining donations, conducting surveys, and propagating information or calls to action.

A CTI system will typically receive a call list associated with a call campaign from a host computer or other source of call records for the campaign. A call campaign in such a system is uniquely associated with a calling party on whose behalf the call is placed. A call record includes information regarding a potential customer, including a telephone number that can be dialed by the CTI system in order to contact the potential customer. The call list may additionally comprise information about each individual such as whether or not they are homeowners, income bracket, purchase history, etc. Associated with a call center is a plurality of call center agents. These call center agents each utilize workstations, which communicate, electronically through the CTI system to one or more host computers, in order to provide an agent with information regarding a call record and information regarding the purpose of a call, such as a telemarketing script or the like.

CTI systems routinely include (or appear as standalone) predictive dialers, which are well known in the art and enable a call center to maximize the utilization of call center agents by automatically dialing telephone numbers associated with call records according to a simple or sophisticated call placing algorithm. For instance, predictive dialers such as the MOSAIX Predictive Dialing System manufactured by Avaya Incorporated or the Call Processing System of SER automatically dial outbound telephone calls to contact individuals and then transfer the contacted individuals to agents, so that the agent can talk with the individual. CTI systems also include call classifiers, which are able to readily detect busy signals, answering machines, voice mail, as well as telephone calls that are answered by a live person. When the call classifier detects a live person, the CTI system substantially immediately connects the live person or contacted party to an available call center agent. A finely tuned predictive dialer will attempt to pace the initiation of outbound calls so that an agent is always available to answer a call to a connected party while, at the same time, ensuring that there is not an abundance of unutilized agents at any particular time.

Typically, as a result of statistical fluctuations and transient conditions, some calls are placed by the predictive dialer and answered by individuals before a call center agent is available. These answered calls are known as overdials.

One way that predictive dialers handle an overdial is to terminate the call by hanging up on the answering individual. A second way that predictive dialers handle an overdial is to direct the answered call to a message player—which plays a prerecorded announcement from the party on whose behalf the overdialed call was placed. The message player plays a message that has been assigned to the list being dialed. When a dialer is able to dial more than one list concurrently, each list is typically associated with a unique message of its own.

Currently, the calling party and the message must be identified at the time a call campaign is set up and these are assigned to all the names on the calling list before the campaign begins without regard to any unique information about the called party or the context of the call. Periodically, the message may be altered mid-campaign. When this occurs, the altered message is subject to the same limitations that the original message was. There is also no ability to place a call to a name on a calling list without uniquely identifying the calling party prior to the initiation of dialing.

Generally, the bigger the calling list the more efficient the dialing. One way to increase the size of lists is to combine the lists for several calling campaigns in which each individual is pre-identified and associated with a unique calling party. Because the message assigned to the call campaign may not be relevant for each individual on the call list, some overdialed calls where a message is played are "wasted" because the message played was not applicable for the individual answering the call. For example, a message about a home improvement project such as vinyl siding is wasted on an individual renting an apartment because the renter is not permitted to authorize such work. However, that same individual may be considering purchasing a home such that a message regarding mortgages may result in a sale.

Therefore, there exists a need to provide more relevant messages to such individuals to assist each message in reaching its target rather than the shotgun approach currently used.

In the case of calling campaigns associated with a unique calling party, the appropriateness of the single message is less problematic; however, this often limits the size of the list and therefore the efficiency of the dialing. And while the general message may be appropriate, the relevance of the message could be enhanced by targeting it more specifically to the called party. For example, on a list of potential credit card applicants, the relevant credit limit or interest rate might be important to message effectiveness.

The most versatile and efficient use of a dialer would defer identification of the calling party (and associated message) until after the dial is placed (or provide the functional equivalence of allowing the call to be reassigned from its original calling party to the campaign of a different calling party). The longer the decision to assign a call to a calling party can be deferred, the more efficiently the dialer will perform. The most efficient assignment would occur immediately after the call is answered. This would enable the dialer to place a dial and subsequently assign the answered call based on dynamic real-world factors, such as, for example, the availability of agents trained on a specific offer or the economic value of a call based on assigning it to a specific called party or a quota.

Additionally, it is desirable to enhance the experience that individuals receive when transferred to a message player so as to increase the probability that the individual will not prematurely terminate the call thereby reducing the effectiveness of the message.

In view of the present disclosure or through practice of the present invention, other advantages may become apparent.

SUMMARY OF THE INVENTION

The present invention provides several improvements over the prior art such as the following:

The present invention comprises a method for assigning messages to individuals on a call list and optionally to assign calling parties from a list of choices. The inventive method comprises the steps of: (1) providing a call list from which to place telemarketing telephone calls, the call list comprises at least one entry, each entry comprises screening information and information enabling assignment of a connected call to at least one calling party; (2) providing at least two different messages, each message being associated with a specific calling party and having a target demographic, purchase, or other qualifying characteristic; and (3) assigning each entry a message by comparing the screening information with the target characteristic; and (4) where more than one message may be qualified to play based on screening information, applying rules governing message assignment.

The screening information provides the vehicle by which the various entries on the call list may be sorted or filtered for assigning a particular message to a particular entry. Although any relevant screening information may be stored in the call list it is preferred that the screening information comprises at least one piece of data selected from the group consisting of pre-identified factors such as: name, telephone number, address, city, state, area code, income bracket, income, home ownership, political affiliation, race, sex, marital status, presence of children, age of children, credit status, credit limit, amount due, amount overdue, educational background, purchase history, donation history, quotas for the calling campaign, the projected profitability of the calling campaign, socio-economic data, census data, purchase history, political affiliation, religious affiliation, contact history, do-not-call status, message history, etc.

The rules provide a means of assigning a message when the screening filter fails to identify a unique (or best) message among available messages. For example, an individual could be qualified for one of several messages from a single calling party or for messages from different calling parties. Rules would typically be based on information used in screening and complementary information about calling parties, but rules could also include other information such as information about campaign quota completion or about the likely economic value of a call to calling parties or their service providers such as telemarketing agencies. That is, assignment could be based on profitability to the calling party or its agent. Additionally, the call may be randomly assigned a message from a pool of available messages, rather than assigned based on a rule as provided above.

The present invention further comprises a method for minimizing the number of overdials attributable to a party. The inventive method comprises the steps of: (1) placing a telephone call by using a predictive dialer and a call list; (2) monitoring call center agents to determine call center agent availability, where the call center agents are conducting a telemarketing campaign for at least one calling party; (3) monitoring the telephone call to determine when the telephone call is answered thereby resulting in an answered call; and (4) transferring the answered call for processing, wherein processing is performed by a call center agent if available and wherein processing is performed by a message player if no call center agent is available to process the answered call.

Although the message player could play a message from a pre-identified calling party as the one for which the call center agents are conducting the telemarketing campaign, it is preferred that the dial occur prior to assignment of the call to one of the eligible calling parties. It is even more preferred that the call be assigned to a non-commercial entity, such as a market researcher or a nonprofit and that the message player plays a message consisting of non-commercial speech, such as a public service announcement or a call to action.

The present invention additionally comprises a method for conducting a telemarketing call campaign. The inventive method comprises the steps of: (1) providing a call list from which to place telemarketing telephone calls, the call list comprising at least one entry, each entry comprising screening information; (2) providing at least two different messages, with associated message and calling party information to be used in rules processing, and other campaign management information such as quota status of the calling campaign or potential economic value of a call; (3) assigning each entry a message by applying rules for comparing the screening information with the message target and other information; (4) placing a telephone call using a predictive dialer and the call list; (5) monitoring call center agents to determine call center agent availability, where the call center agents are conducting a telemarketing campaign for a first party; (6) monitoring the telephone call to determine when the telephone call is answered thereby resulting in an answered call; and (7) transferring the answered call for processing, wherein processing is performed by a call center agent if available and wherein processing is performed by a message player playing the message assigned to the entry if no call center agent is available to process the answered call.

The message player may play any number of messages to the individual answering the telephone. However, it is preferred that the individual is played as many messages as are applicable during the period that the individual is on the telephone with the message player. It is equally preferred that the individual be invited to complete at least one at least partially automated transaction during the telephone call. It is further preferred that at least one of the at least partially automated transactions is selected from the group consisting of: responding to a survey, placing a request for more information or for an order, making a pledge to donate, scheduling a callback or an appointment, providing feedback on a call to action, requesting to be transferred to the next available qualified agent, requesting to be placed on a do-not-call list, wrong party contact notification, promising to pay on a debt, promising to call back, confirming that a message was received by the party, confirming that an action will be taken, updating the entry information, etc. Of course, it is most preferred that the at least partially automated transaction is fully automated.

It is additionally preferred that the individual answering the telephone is invited by the message player to verify at least a portion of the screening information associated with the individual's respective entry on the call list. It is even more preferred that the message player is capable of accepting updated screening information from the individual and updating the call list with the updated screening information. It is further preferred that the message player is capable of modifying or switching the message associated with the entry based upon the updated screening information.

Although any relevant screening information may be stored in the call list, it is preferred that the screening information comprises at least one piece of data selected from the group consisting of: name, telephone number, address, city, state, area code, income bracket, income, home ownership, political affiliation, race, sex, marital status, presence of children, age of children, credit status, credit limit, amount due, amount overdue, educational background, purchase history, donation history, quotas for the calling campaign, the projected profitability of the calling campaign, socioeconomic data, census data, purchase history, political affiliation, religious affiliation, contact history, do-not-call status, message history, etc.

It is also preferred that the message associated with an entry comprises dynamically generated content. That is, content inserted into a canned message so as to personalize the message for a given individual. For example, a unique amount due by an individual may be inserted into a canned message so as to fluidly present a message stating the amount due by that particular individual. Or the item offered or the price of an item offered could be dynamically tailored to the customer or the questions on a survey, or a meeting or dealer location could be assigned based on the contact's address and/or quotas, etc.

It should be noted that security measures such as log-in IDs and passwords may be employed to verify the identity of the individual answering the telephone. However, it is preferred that the entry additionally comprises a voice print of the individual associated with the entry. The voice print could preferably be used to verify the identity of the individual answering the telephone as the entity for whom the telephone call was placed. Further, voice print identification could preferably be used for verification prior to playing a message containing dynamically generated content so as to protect the privacy of the individual being called.

Although in the case of a campaign with only one calling party eligible, the message player could play a rule-driven message from the sole calling party, it is preferred to include messages from at least two calling parties and that the decision to assign the message and the calling party is deferred until after the phone is answered. It is even more preferred that the message player plays a message consisting of non-commercial speech, such as a public service announcement, a call to action, or a request to undertake a survey.

DETAILED DESCRIPTION OF THE PREFERRED EMBODIMENT(S)

In accordance with the foregoing summary of the invention, the following presents a detailed description of the preferred embodiment of the invention which is presently considered to be its best mode.

The present invention comprises several advancements over the prior art such as assigning calling parties and associated messages by rules that are applied to individuals on the calling list rather than assigning everyone on the calling list to the same message. Rules can even be extended to include information such as information about the projected economics of the calling itself or quotas. In order to associate a given message with its target demographic, screening information for the entry must be available as well as information about the calling parties and messages. Such screening information may be any relevant information used to identify the target, for example—order history, zip code, home owner, etc. It is preferred that this information is included in the call list. The list itself may be sorted or filtered by any of the information included in the call list. For example, if the call list associates each individual with the individual's telephone number and the individual's income bracket, the call list could be sorted (or filtered) by income bracket such that individuals associated with each discrete income bracket receive a unique message tailored to that income bracket. Although the call list may be sorted by any of the screening information, the call list may not necessarily be executed in that order—for example, the call list may be sorted by time zone so that the calling campaign begins with calls to the Eastern Time Zone and avoids calling the Pacific Time Zone until later in the day.

The present invention further permits that the answering individual may be presented with the option of engaging in a fully or partially automated transaction. For example, the individual could be given the option of taking a survey. The individual could be provided with a variety of options such as placing an order, responding to a survey, placing a request for more information or for an order, making a pledge to donate, scheduling a callback or an appointment, providing feedback on a call to action, requesting to be transferred to the next available qualified agent, requesting to be placed on a do-not-call list. In a partially automated transaction, the information entered by the individual up to the point of being transferred to a call center agent is preserved and transferred to the call center agent with the individual.

A more complex application of the present invention permits interactivity before, during, and/or after the message is played to allow for "wrong party" contacts such as occurs when the call list contains outdated information. For example, Mr. Jones may be associated with telephone number 555-555-1555. However, Mr. Jones may have recently moved and is no longer the owner of telephone number 555-555-1555. Therefore, when Ms. Shaw answers the telephone, the message she hears may not be applicable for her, as it was directed to Mr. Jones. However, with the present invention, the individual answering the telephone may be asked to verify whether they are the party on the call list. In the above example, Ms. Shaw would be asked if she is Mr. Jones. The present invention further permits Ms. Shaw to correct the call list with updated information, thereby ensuring that future calls placed from that call list are targeted towards Ms. Shaw rather than Mr. Jones. Although the information may be entered via the telephone touchpad, it is preferred that the information be entered as speech.

The present invention further includes the capability for the message to contain dynamically generated content derived from the call list or associated database file. For example, in a call about an overdue bill, the amount that is overdue and other information could be included in the message. Obviously, it is desirable to provide selected private content only after verifying the identity of the called party so as to protect that individual's privacy. An advanced application of the present invention would store a private password that could be keyed in or spoken or, most preferably, a voice print of the individual on the call list to compare to the voice of the answering party so as to further preserve the privacy of the individual. The message may be highly customized based upon information associated with the called party and the calling party. The level of customization depends in part on the flexibility of the messaging system and its capability to play a message containing dynamically generated content.

The present invention further provides the ability to assign an unassigned dialed telephone call to a calling party after a dial is made, even if assignment is immediately after time of answer, or to re-assign a dialed telephone call from one calling party to another.

The present invention further provides the ability to assign an unassigned dialed telephone call to a calling entity after a dial is made, even if assignment is immediately after time of answer, or to re-assign a dialed telephone call from one dialing entity to another.

In view of the present disclosure or through practice of the present invention, it will be within the ability of one of ordinary skill to make modifications to the present invention, such as through the use of equivalent arrangements and compositions, in order to practice the invention without departing from the spirit of the invention as reflected in the appended claims.

What is claimed is:

1. A method for deferring the assignment of a campaign and a message until after an outbound call is answered, said method comprising the steps of:
   providing a plurality of unique telemarketing campaigns;
   storing said campaigns and one or more messages associated with each campaign at a host computer;
   storing a call list at a host computer said call list comprising at least one entry, each said entry comprising screening information and a telephone number, wherein said entries have not been assigned to any of said unique campaigns;
   placing a telephone call using a predictive dialer to one said entry from said call list;
   monitoring said telephone call to determine when said call is answered thereby resulting in an answered call;
   selecting a campaign by said host computer for said answered call wherein said selection is made according to said screening information associated with said entry and stored within said call list;
   assigning said selected campaign to said answered call for said entry from said call list;
   selecting a message associated with said campaign at said host computer based on said screening information associated with said entry and stored within said call list; and
   assigning said selected message to said answered call for said entry from said call list.

2. The method according to claim 1 wherein said screening information comprises at least one piece of data selected from the group consisting of: name, telephone number, address, city, state, area code, income bracket, income, home ownership, political affiliation, race, sex, marital status, presence of children, age of children, credit status, credit limit, amount due, amount overdue, educational background, purchase history, donation history, quotas, projected profitability, socioeconomic data, census data, purchase history, political affiliation, religious affiliation, do not call status, message history, and contact history.

3. A method for deferring the assignment of a campaign and a message until after an outbound call is answered, said method comprising the steps of:
   providing a plurality of unique telemarketing campaigns;
   storing said campaigns at a host computer;
   storing a call list at a host computer, said call list comprising at least one entry, each said entry comprising screening information and a telephone number, wherein the entries have not been assigned to any of the unique campaigns;
   placing a telephone call using a predictive dialer to one said entry, from the call list;
   monitoring call center agents to determine call center agent availability;
   monitoring said telephone call to determine when said telephone call is answered thereby resulting in an answered call;
   selecting a campaign by said host computer for said answered call based on said screening information associated with said entry and stored within said call list;
   assigning said answered call to said selected campaign; and transferring said answered call for processing, wherein said processing is performed by a call center agent if available and wherein said processing is performed by a message player if no call center agent is available to process said answered call.

4. The method according to claim 3 wherein said message player plays a message consisting of non-commercial speech.

5. The method according to claim 3 further comprising storing two or more different messages at said host computer;
   selecting a message based on said screening information; and
   wherein said message player plays the selected message if no call center agent is available to process said answered call.

6. The method according to claim 5 wherein said message player additionally asks the party answering said call to complete at least one at least partially automated transaction.

7. The method according to claim 6 wherein said at least one at least partially automated transaction is selected from the group consisting of:
   responding to a survey, placing an order, requesting information, scheduling an appointment, requesting to be placed on a do-not-call list, making a donation, making a pledge, wrong party contact notification, promising to pay on a debt, promising to call back, confirming that a message was received by a party, confirming that an action will be taken, and updating said entry.

8. The method according to claim 6 wherein said at least partially automated transaction is fully automated.

9. The method according to claim 5 wherein said message player additionally invites the party answering said telephone call to verify at least a portion of said screening information associated with said party's respective entry on said call list.

10. The method according to claim 9 wherein said message player is capable of accepting updated screening information from said individual and updating said call list with said updated screening information.

11. The method according to claim 10 wherein said message player is capable of modifying further messages associated with said entry based upon said updated screening information.

12. The method according to claim 5 wherein said screening information comprises at least one piece of data selected from the group consisting of:
   name, telephone number, address, city, state, area code, income bracket, income, home ownership, political affiliation, race, sex, marital status, presence of children, age of children, credit status, credit limit, amount due, amount overdue, educational background, purchase history, donation history, quotas, projected profitability, socioeconomic data, census data, purchase history, political affiliation, religious affiliation, do not call status, message history, and contact history.

13. The method according to claim 5 wherein said message associated with said entry comprises dynamically generated content.

14. The method according to claim 13 wherein said dynamically generated content comprises anyone of the following: a unique amount due by an individual, an item offered, a price of an item offered, a meeting location, and a dealer location.

15. The method according to claim 5 wherein said entry additionally comprises a voice print of an individual associated with said entry.

16. The method according to claim 15 wherein said voice print is used to verify said individual on said call list prior to playing a message comprising dynamically generated content.

17. The method according to claim 3 further wherein said step of selecting a calling party for said answered call is further based on anyone of the following factors: a campaign quota, an economic value of the answered call to the calling party, an economic value of the call to the telemarketing agency, and the availability of agents trained on a specific offer.

18. A method for deferring the assignment of a telemarketing campaign and a message for said telemarketing campaign until after an outbound call is dialed, said method comprising the steps of:

provviding a plurality of unique telemarketing campaigns;

storing said campaigns at a host computer;

storing a call list at a host computer, said call list comprising at least one entry, each said entry comprising screening information and a telephone number, wherein the entries have not been assigned to any of the unique campaigns;

placing a telephone call using a predictive dialer to one said entry on said call list resulting in a dialed call;

monitoring said dialed call to determine when said dialed call is answered thereby resulting in an answered call;

monitoring call center agents to determine call center agent availability; and selecting and assigning a campaign by said host computer to said dialed call prior to said call being answered, wherein said selecting and assigning is based on said screening information associated with the entry from said call list and said call center agent availability.

19. The method of claim 18 further comprising:

re-selecting and re-assigning a different telephone campaign from said host computer to said dialed call prior to said call being answered, wherein said re-selecting and re-assigning is based on said screening information associated with the entry from said call list and said call center agent availability.

20. The method of claim 18 further comprising:

re-selecting and re-assigning a different telephone campaign from said host computer to said answered call, wherein said re-selecting and re-assigning is based on said screening information and said call center agent availability.

* * * * *

UNITED STATES PATENT AND TRADEMARK OFFICE
CERTIFICATE OF CORRECTION

PATENT NO.         : 7,630,905 B1  
APPLICATION NO.    : 10/753025  
DATED              : December 8, 2009  
INVENTOR(S)        : Ralph Reese Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Second Day of November, 2010

David J. Kappos  
*Director of the United States Patent and Trademark Office*